US009720113B2

(12) United States Patent
Nakayama et al.

(10) Patent No.: US 9,720,113 B2
(45) Date of Patent: Aug. 1, 2017

(54) MUON TRACKER AND MUON TRACKING METHOD (71) Applicant: KABUSHIKI KAISHA TOSHIBA, Minato-Ku (JP)

(72) Inventors: Kohichi Nakayama, Yokohama (JP); Haruo Miyadera, Yokohama (JP); Kenichi Yoshioka, Yokohama (JP); Tsukasa Sugita, Yokohama (JP); Naoto Kume, Yokohama (JP); Yuichiro Ban, Fujisawa (JP)

(73) Assignee: KABUSHIKI KAISHA TOSHIBA, Minato-Ku (JP)

( * ) Notice: Subject to any disclaimer, the term of this patent is extended or adjusted under 35 U.S.C. 154(b) by 311 days.

(21) Appl. No.: 14/596,637

(22) Filed: Jan. 14, 2015

(65) Prior Publication Data
US 2016/0377747 A1  Dec. 29, 2016

(30) Foreign Application Priority Data

Jan. 14, 2014  (JP) ................................. 2014-004523

(51) Int. Cl.
*G01T 1/18* (2006.01)
*G01T 5/00* (2006.01)
(Continued)

(52) U.S. Cl.
CPC .............. *G01T 5/00* (2013.01); *G01T 1/2935* (2013.01); *H01J 47/02* (2013.01); *H01J 47/08* (2013.01)

(58) Field of Classification Search
CPC  G01T 1/2935; G01T 5/02; H01J 47/02; H01J 47/08
See application file for complete search history.

(56) References Cited

U.S. PATENT DOCUMENTS

2008/0228418 A1* 9/2008 Green ..................... G01N 23/20
702/81
2010/0065745 A1* 3/2010 Goldberg .............. G01T 1/2935
250/358.1

FOREIGN PATENT DOCUMENTS

JP  2004-108912 A  4/2004
JP  2004-172794 A  6/2004
(Continued)

OTHER PUBLICATIONS

Japanese Office Action issued Nov. 29, 2016 in Patent Application No. 2014-004523 (without English Translation).

Primary Examiner — Kenneth J Malkowski
(74) Attorney, Agent, or Firm — Oblon, McClelland, Maier & Neustadt, L.L.P.

(57) ABSTRACT

A muon tracker includes a drift tube detector having a plurality of drift tube arrays, a detection time-difference calculation circuit configured to calculate a detected time-difference between a plurality of time data detected at least two of the drift tubes, a time-difference information database that stores a relationship between a plurality of predetermined tracks of the muon passing the drift tube detector and a predetermined time-difference of possible detected time data to be detected at least two of the drift tubes where each of the plurality of predetermined tracks passes, a time-difference referring circuit configured to refer the detected time-difference calculated at the detection time-difference calculation circuit with the predetermined time-difference stored in the time-difference information database, and a muon track determining circuit configured to determine a muon track as the predetermined track of the muon corresponding to the predetermined time-difference that matches the best with the detected time-difference.

5 Claims, 8 Drawing Sheets

(51) Int. Cl.
*G01T 1/29* (2006.01)
*H01J 47/08* (2006.01)
*H01J 47/02* (2006.01)

(56) References Cited

FOREIGN PATENT DOCUMENTS

| | | |
|---|---|---|
| JP | 2006-223420 A | 8/2006 |
| JP | 2009-50738 A | 3/2009 |
| JP | 2010-508521 A | 3/2010 |

* cited by examiner

MUON TRACKER AND MUON TRACKING METHOD

CROSS-REFERENCE TO RELATED APPLICATION

This application is based upon and claims the benefit of priority from Japanese Patent application No. 2014-004523, filed on Jan. 14, 2014, the entire content of which is incorporated herein by reference.

BACKGROUND OF THE INVENTION

Field of the Invention

Embodiments of the present invention relate to a technique of detecting a muon track.

Related Art

Among techniques of imaging an interior of a structure, techniques of seeing through the interior by observing muons reaching the surface of the Earth have been known. These techniques have been suitably used for large structures into which access is difficult, including, for instance, volcanoes and pyramids.

Among the techniques of seeing through the interior of a structure using muons, transmission methods of measuring attenuation of a muon particle flux, and scattering methods of measuring Coulomb multiple scattering angles of muons have been known. Among the scattering methods, a displacement method of measuring the displacement of a muon track due to Coulomb multiple scattering has been known.

The technique of seeing-through using muons requires a muon tracker provided outside of a structure to be seen through. This tracker detects a muon track, and analyzes this track, thereby imaging the interior of the structure.

The muon tracker includes arrays of drift tubes in which drift gas is sealed are stacked into multiple layers. Anode wire is stretched at the center of each drift tube. When a charged particle, such as a muon, passes through the drift tube, the internally sealed gas is ionized to release electrons. Arrival of the released electrons at the anode wire is detected as transit of a muon.

The drift radius (the distance from the anode wire) can be acquired by converting the drift time until the arrival of electrons at the anode wire. The muon track of one passing muon forms a straight line. Accordingly, the muon tracker detects the muon track by calculating the common tangent of circles having the drift radii.

The calculation of the muon track requires the time in which the muon passes through the drift tube. Conventionally, a detector for measuring the transit time is separately provided in addition to the drift tube to measure the transit time.

Another method has also been known that does not require any detector other than the drift tube, adopts the muon transit time as a variable referred to as "time-zero" and derives the muon track from a condition that the muon track should form a straight line.

Thus, the technique that adopts the muon transit time as a variable referred to as "time-zero" and derives the muon track from the condition that the muon track should form a straight line does not separately require any detector for measuring the transit time of a muon. However, this technique requires complicated calculation for obtaining the muon transit time. Accordingly, for instance, it is difficult to detect the muon track in real time.

SUMMARY OF THE INVENTION

To solve the above problems, it is an object of present invention to provide techniques in which a muon track can be swiftly detected with a simple configuration.

A muon tracker according to an embodiment of the present invention includes a drift tube detector comprising a plurality of drift tube arrays, each of the drift tube arrays comprises a plurality of drift tubes aligning parallel to each other, wherein each of the drift tubes is configured to detect a muon passing therein, a detection time-difference calculation circuit configured to calculate a detected time-difference between a plurality of time data detected at least two of the drift tubes that detect the muon passing therein, a time-difference information database that stores a relationship between a plurality of predetermined tracks of the muon passing the drift tube detector and a predetermined time-difference of possible detected time data to be detected at least two of the drift tubes where each of the plurality of predetermined tracks passes, a time-difference referring circuit configured to refer the detected time-difference calculated at the detection time-difference calculation circuit with the predetermined time-difference stored in the time-difference information database, and a muon track determining circuit configured to determine a muon track as the predetermined track of the muon corresponding to the predetermined time-difference that matches the best with the detected time-difference.

A muon tracking method according to an embodiment of the present invention includes detecting a passing of a muon in a drift tube detector, wherein the drift tube detector comprises a plurality of drift tube arrays, each of the drift tube arrays comprises a plurality of drift tubes aligning parallel to each other, storing a relationship between a plurality of predetermined tracks of the muon passing the drift tube detector and a predetermined time-difference of possible detected time data to be detected at least two of the drift tubes where each of the plurality of predetermined tracks passes, calculating a detected time-difference between a plurality of time data detected at least two of the drift tubes detected the passing of the muon, referring the detected time-difference with the predetermined time-difference, and determining a muon track as the predetermined track of the muon corresponding to the predetermined time-difference that matches the best with the detected time-difference.

DESCRIPTION OF THE EMBODIMENTS

Embodiments of the present invention are now described with reference to the accompanying drawings.

Figure 1:
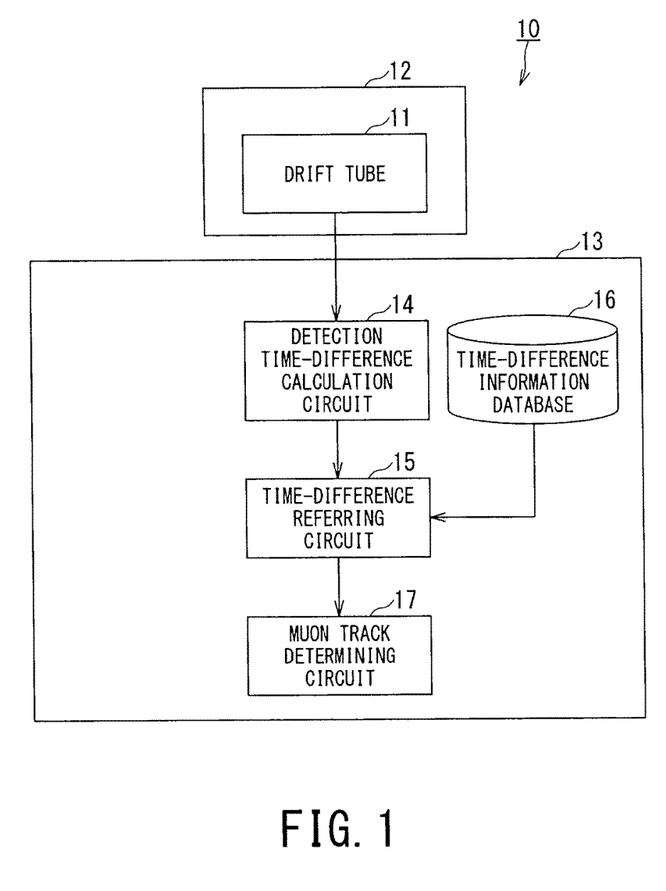
FIG. 1 is a configuration diagram of a muon tracker according to this embodiment.

A muon tracker 10 according to an embodiment shown in FIG. 1 comprises: a drift tube detector 12 comprising a plurality of drift tube arrays, each of the drift tube arrays comprises a plurality of drift tubes 11 aligning parallel to each other, wherein each of the drift tubes 11 is configured to detect a muon passing therein; a detection time-difference calculation circuit 14 configured to calculate a detected time-difference between a plurality of time data detected at least two of the drift tubes 11 that detect the muon passing therein; a time-difference information database 16 that stores a relationship between a plurality of predetermined tracks of the muon passing the drift tube detector 12 and a predetermined time-difference of possible detected time data to be detected at least two of the drift tubes 11 where each of the plurality of predetermined tracks passes; a time-difference referring circuit 15 configured to refer the detected time-difference calculated at the detection time-difference calculation circuit 14 with the predetermined time-difference stored in the time-difference information database 16; and a muon track determining circuit 17 configured to determine a muon track as the predetermined track of the muon corresponding to the predetermined time-difference that matches the best with the detected time-difference.

Figure 2:
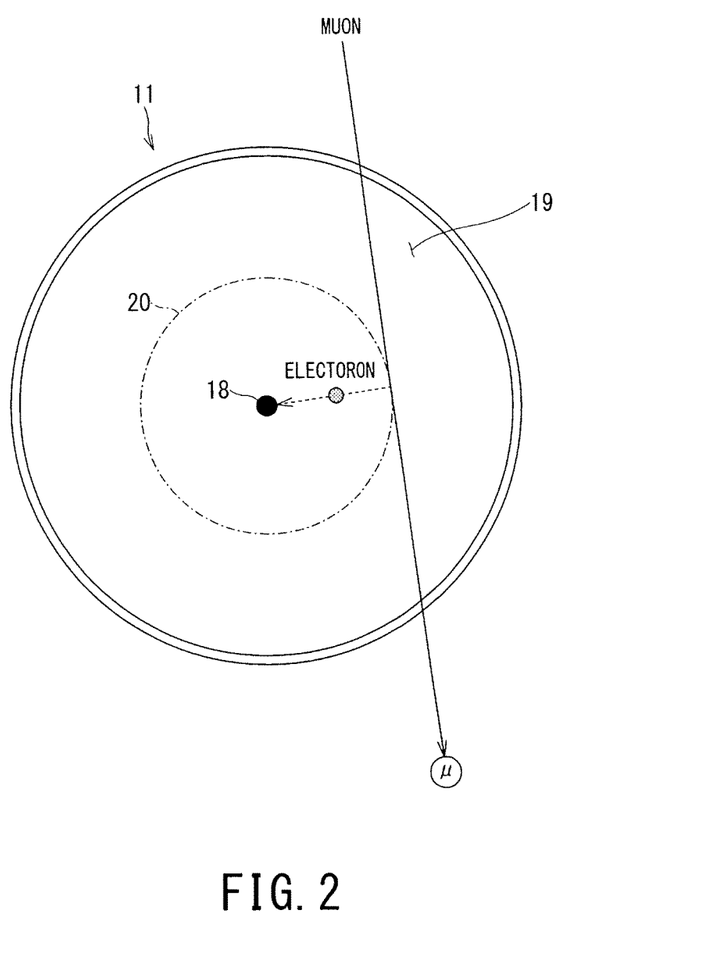
FIG. 2 is a sectional view of a drift tube applied to this embodiment.

FIG. 2 shows a sectional view of the drift tube 11.

The drift tube 11 is a cylindrical tube made of aluminum. Anode wire 18 to which a high voltage is applied is stretched at the center of the cylindrical tube. Drift gas 19 predominantly composed of an inert gas is sealed the drift tube 11.

When a muon passes through the drift tube 11, the drift gas 19 is ionized to be separated into ions and electrons. When the electrons reach the anode wire 18, an electric signal is output from the drift tube 11, thus detecting the transit of the muon through the drift tube 11.

A detection time when each drift tube 11 detects the transit of the muon is a point in time when the muon having actually passed through the drift tube 11 to ionize the drift gas 19 to be separated into ions and electrons allows the electrons to reach the anode wire 18. Accordingly, there is a time difference between the time (muon transit time) when the muon actually passes through the drift tube 11 and the detection tune of the muon; the time difference depends on the distance between the position where the muon passes through the drift tube 11 and the anode wire 18. If a muon is detected by at least three layers of drift tubes 11, the muon track can thus be determined using the common tangent. Accordingly, the muon track can be determined on the basis of the detection time of the muon.

Figure 3A:
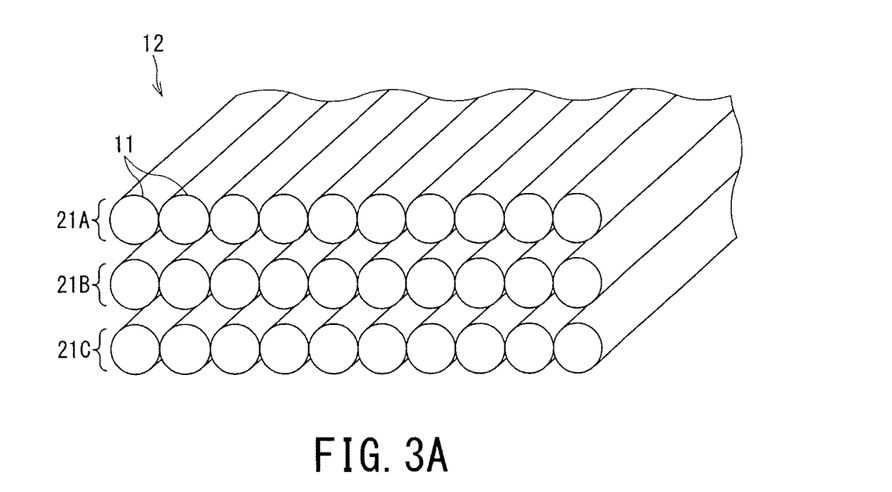
FIGS. 3A, 3B and 4 are diagrams showing examples of arrangement of drift tubes applied to this embodiment.
Figure 3B:
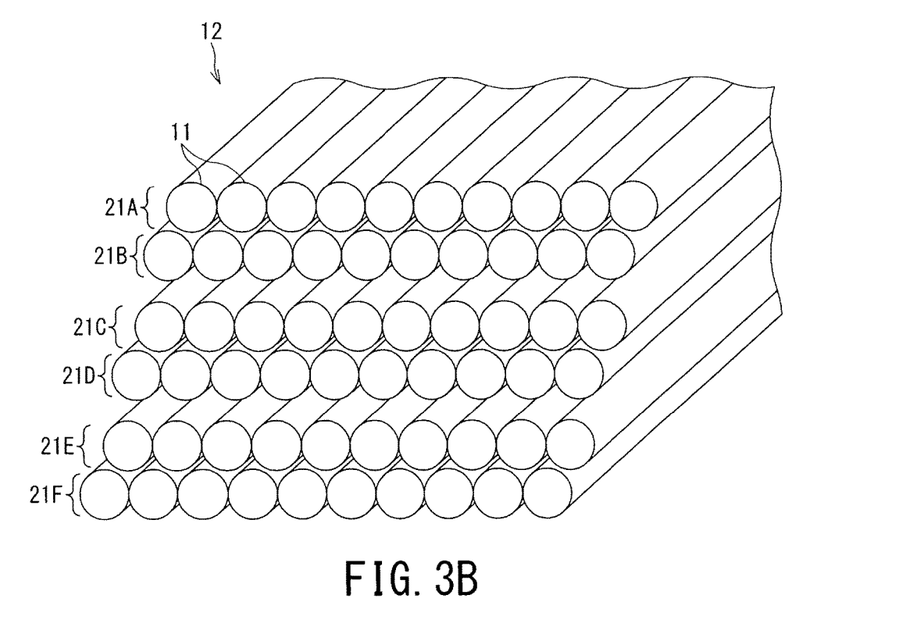
Figure 4:
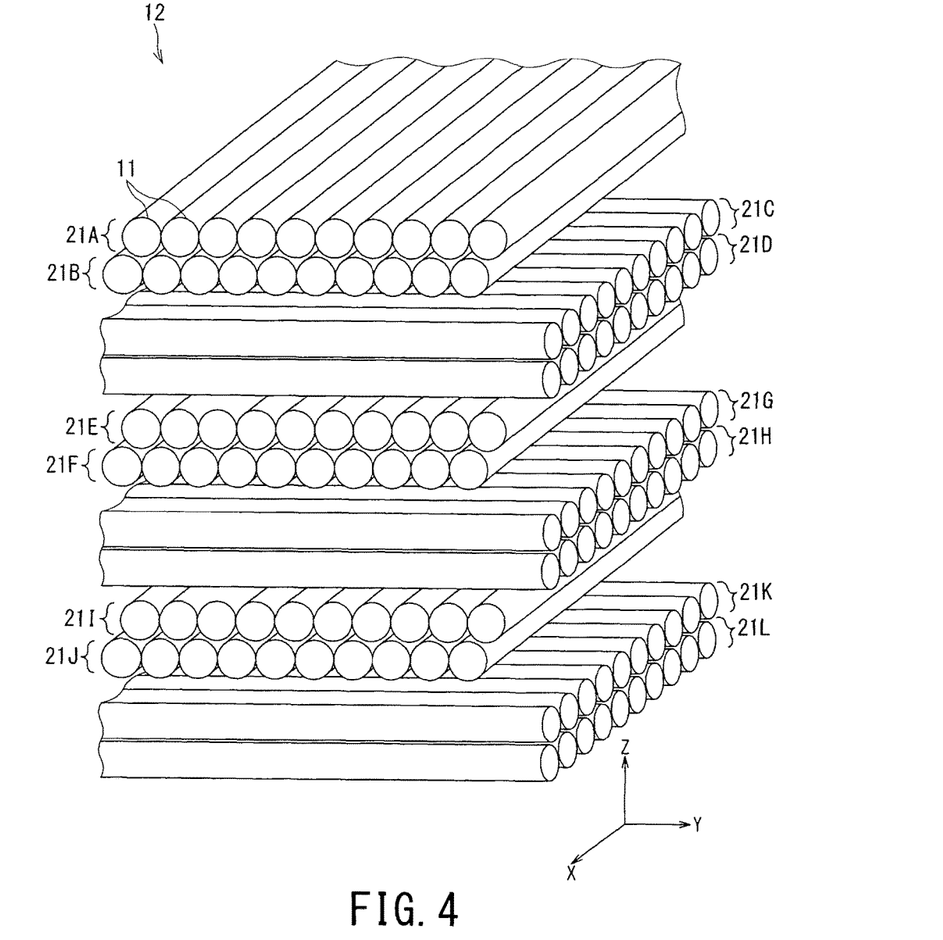

FIGS. 3A, 3B and 4 are diagrams showing examples of arrangement of the drift tubes 11. The drift tube detector 12 includes drift tubes 11 arranged into multiple layers. That is, the drift tube detector 12 has a configuration where drift tube arrays including parallel-arranged drift tubes 11 are stacked into multiple layers, and the stacking direction coincides with the normal of the plane formed by each drift tube array. In order to accurately detect the muon track, it is preferred that at least three layers of drift tube arrays be arranged.

In the example of FIG. 3A, three drift tube arrays (21A, 21B and 21C) each including parallel-arranged drift tubes 11 are configured to be stacked in the direction of the normal of the plane formed by each drift tube array.

In the example of FIG. 3B, two layers of drift tube arrays form a pair. The two layers are close to each other, but the center positions of tubes in both layers deviate from each other. Three pairs of drift tube arrays are stacked to configure an arrangement including total six layers (21A, 21B, 21C, 21D, 21E and 21F).

In the example of FIG. 4, drift tube arrays 21A, 21B, 21C, . . . are arranged such that pairs of two layers are alternately stacked in an orthogonal manner to form total twelve layers of drift tube arrays 21A, 21B, . . . . That is, six layers of drift tube arrays (21A, 21B, 21E, 21F, 211 and 21J) which longitudinally extend along the X direction and are arranged in parallel in the Y direction, and another six layers of drift tube arrays (21C, 21D, 21G, 21H, 21K and 21L) which longitudinally extend in the Y direction and are arranged in parallel in the X direction thus form the total twelve layers. Such a stack of the drift tube arrays 21A, 21B, 21C, . . . each including arrangement the drift tubes 11 can three-dimensionally detect the muon track of a muon.

The drift tube detector 12 transmits a detection signal detected by a drift tube 11 in the drift tube detector 12 together with positional information on the drift tube 11 to a muon track analyzer 13.

The muon track analyzer 13 includes the detection time-difference calculation circuit. 14, the time-difference information database 16, the time-difference referring circuit. 15, and the muon track determining circuit 17. The functions of units configuring the muon track analyzer 13 may be achieved by an electronic circuit, such as a processor, executing predetermined program code. Instead of such a software process, a hardware process through use of, for instance, an electronic circuit, such as an ASIC may achieve the functions. Alternatively, a combination of a software process and a hardware process may achieve the functions.

The detection time-difference calculation circuit 14 calculates the time difference between detection times of the drift tubes 11 when detection signals are output, on the basis of these detection times of the drift tubes 11. The time difference between the drift tubes 11 is obtained by calculating the difference from the detection time of each drift tube 11 with reference to the detection time of a freely selected drift tube 11.

Figure 5:
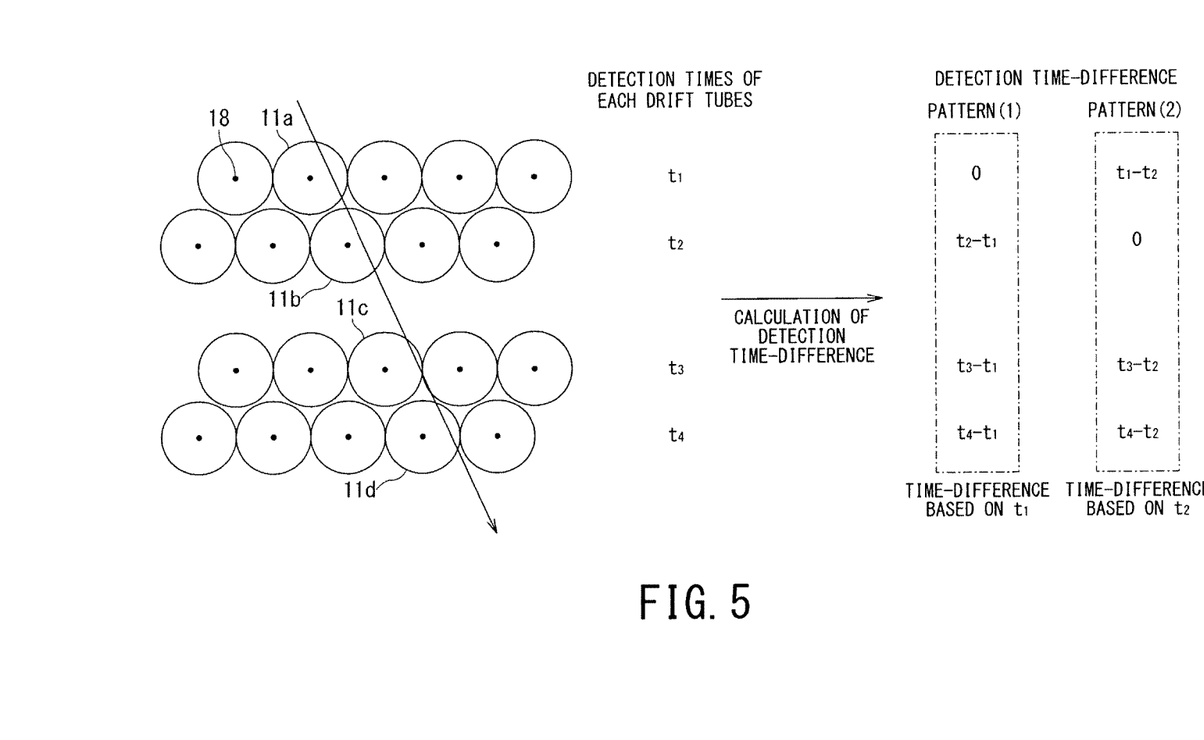
FIG. 5 is a diagram illustrating a method of obtaining a time difference from a detection time at each drift tube.

FIG. 5 is a diagram illustrating a method of obtaining the time difference between the detection times of the drift tubes 11 on the basis of the detection times of the drift tubes 11. It is herein assumed that detection signals of a muon are output from the drift tubes 11a to 11d, and the detection times of the drift tube 11 are $t_1$ to $t_4$, respectively.

FIG. 5 shows two modes (patterns (1) and (2)) of measuring a time difference. According to the pattern (1), with reference to $t_1$ that is the detection time of the drift tube 11a, the time difference from each drift tube 11 is obtained. According to the pattern (2), with reference to $t_2$ that is the detection time of the drift tube 11b, the time difference from each drift tube 11 is obtained. The pattern is not limited to these two modes. Alternatively, the time difference may be obtained with reference to $t_3$ or $t_4$.

The time-difference information database 16 preliminarily stores, as time-difference information, the time differences between detection times of the drift tubes 11 associated with the respective muon track patterns of a muon assumed for the drift tube detector 12.

The time differences here are calculated on the basis of the detection times of the drift tubes 11 derived by the muon track analyzer 13 or another computer simulating muon tracks of muons. These time differences are required to be calculated according to the same mode of measuring a time difference to be calculated by the detection time-difference calculation circuit 14.

Figure 6:
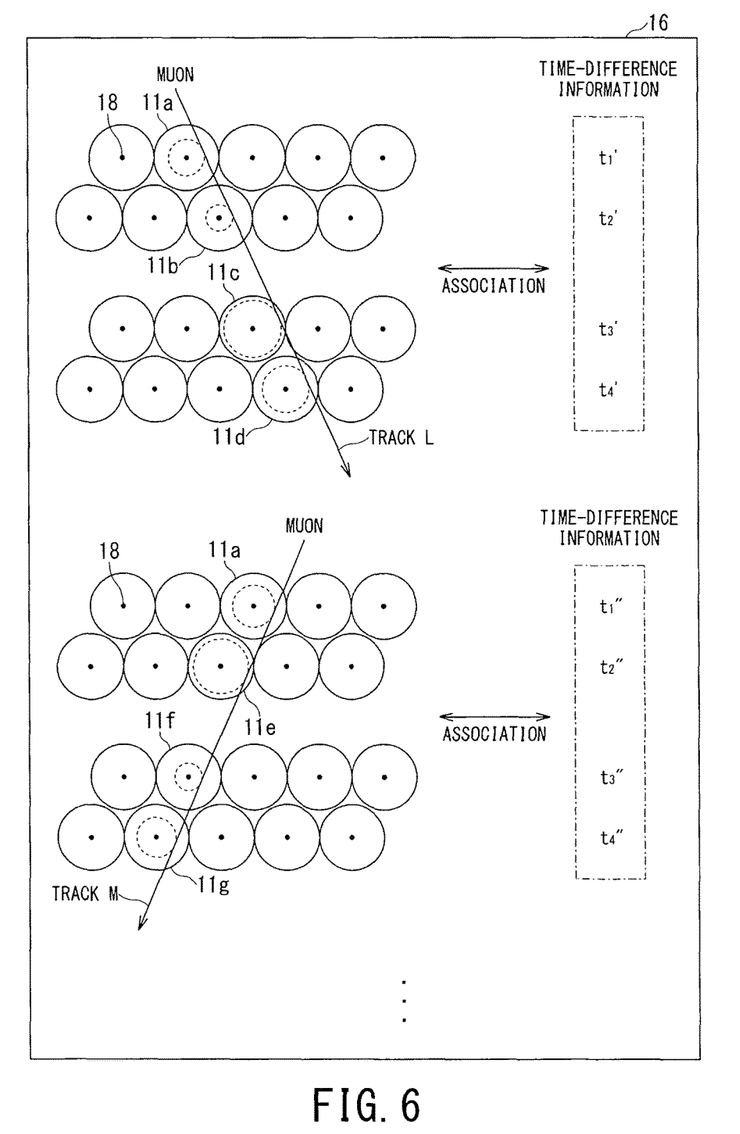
FIG. 6 is a diagram showing pieces of time-difference information stored in association with predetermined muon tracks.

FIG. 6 is a diagram showing pieces of time-difference information stored in the time-difference information database 16 in association with the respective predetermined muon tracks.

Pieces of time-difference information associated with two muon tracks, respectively, are exemplified. In association with a muon track L, a piece of time-difference information $t_1'$ to $t_4'$ between the drift tubes 11a, 11b, 11c and 11d are stored. In association with a muon track M, a piece of time-difference information $t_1''$ to $t_4''$ between the drift tubes 11a, 11e, 11f and 11g are stored.

The time-difference referring circuit. 15 refers to the time difference calculated by the detection time-difference calculation circuit 14 with the piece of time-difference information stored in the time-difference information database 16. If the time differences match with each other, the muon track of a muon corresponding to the piece of time-difference information stored in the time-difference information database 16 is output to the muon track determining circuit 17.

If the time differences (0, $t_2-t_1$, $t_3-t_1$, and $t_4-t_1$) between the drift tubes 11a to 11d shown in FIG. 5 match with the pieces of time-difference information $t_1'$ to $t_4'$ between the drift tubes 11a, 11b, 11c and 11d shown in FIG. 6, it can be derived that the muon track shown in FIG. 5 is the muon track L shown in FIG. 6.

The muon track determining circuit 17 outputs the muon track of a muon corresponding to the matching time-difference information, as the muon track detected by the drift tube detector 12, to a display device, an imaging device (not shown) or the like.

Thus, the time differences between the detection times at the drift tubes 11 are only calculated and referred to with the time-difference information preliminarily stored in association with the muon track, thereby allowing the muon track to be derived. Accordingly, the muon track can be swiftly detected without complicated calculation. For instance, real-time muon track detection can be achieved.

The detection resolution of a muon track set in the time-difference information database 16 is configured to be lower than or equal to any of the spatial resolution and the angular resolution of the drift tube detector 12. That is, the detection resolution of a muon track set in the time-difference information database 16 is configured to be equal to at least any one of the spatial resolution and the angular resolution of the drift tube detector 12, or finer than at least any one of the spatial resolution and the angular resolution.

Typical values of the spatial resolution and the angular resolution of a muon track detected by the drift tube detector 12 are about 0.05 mm and 2 mrad, respectively. The time-difference information database 16 stores the pieces of time-difference information on muon detection times that correspond to respective muon tracks and determined on the basis of the spatial resolution and the angular resolution.

In particular, a resolution set finer than at least any one of the spatial resolution and the angular resolution allows reference to all assumable muon tracks. Accordingly, the muon track can be detected at high accuracy.

In the case of setting a muon track at a resolution finer than the spatial resolution and the angular resolution, reference is required to be made with the time-difference information stored in the time-difference information database 16 through interpolation with time differences between detection times calculated by the detection time-difference calculation circuit 14.

In the case where the drift tube detector 12 includes portions (drift tube groups) having the same arrangement as the arrangement of drift tubes, the time-difference information database 16 may store a representative relationship between muon track patterns and pieces of time-difference information on detection times of the drift tubes 11; the patterns and the respective pieces of information are assumed in the arrangement of the drift tubes 11 in a representative drift tube group and associated with each other. For such a case, another configuration may be adopted. According to this configuration, for the track of a muon passing through any of the drift tube groups, the time-difference referring circuit 15 refers to the time difference calculated by the detection time-difference calculation circuit 14 with the time-difference information on the drift tube 11 having detected the muon transit, using the representative relationship between the muon track pattern of the drift tube group and the time-difference information on detection times between drift tubes 11, which are stored in the time-difference information database 16.

Figure 7:
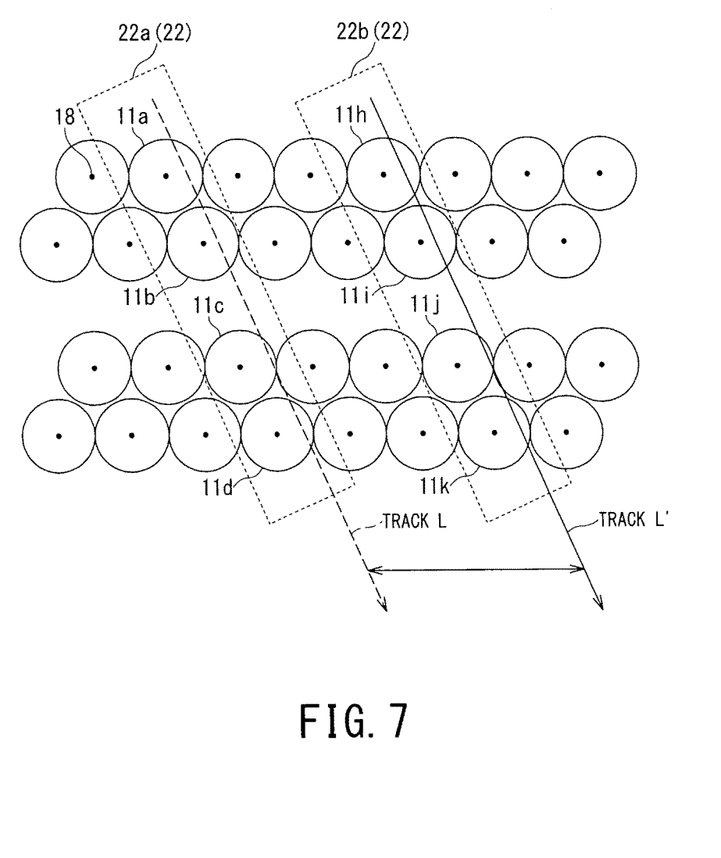
FIG. 7 is a diagram showing drift tubes having the same arrangement.

Referring to FIG. 7, a specific example is described (FIG. 1 should be appropriately referred to). Here, the case where a muon transit is detected by drift tubes 11h to 11k.

As shown in FIG. 7, the drift tubes 11h to 11k have an arrangement, similar to that of the drift tubes 11a to 11d. Each arrangement configures a drift tube group 22 (22a, 22b).

Here, the dine-difference information database 16 stores the relationship between pieces of time-difference information and muon tracks on the drift tubes 11a to 11d, as a representative relationship of the drift tube group 22. The relationship between the pieces of time-difference information and the muon tracks that pertain to the drift tubes 11h to 11k belonging to the same type of the drift tube group 22 can be assumed by reusing the pieces of time-difference information and the muon tracks that pertain to the drift tubes 11a to 11d.

That is, in this case, the time-difference referring circuit 15 refers to the time differences between the drift tubes 11h to 11k calculated by the detection time-difference calculation circuit 14, with the piece of time-difference information on the drift tubes 11a to 11d that is based on the representative relationship of the drift tube groups 22 stored in the time-difference information database 16.

The muon track determining circuit 17 uses the muon track L corresponding to the matching time-difference information on the drift tubes 11a to 11d to determine and output a muon track L' having passed through the drift tubes 11h to 11k.

In such a case where the drift tube detector 12 includes drift tube groups having the same arrangement of the drift tubes 11, derivation of the muon track through use of the fact that the arrangements of the drift tubes 11 of the drift tube groups are the same as each other can reduce the number of patterns of muon tracks to be stored in the time-difference information database 16.

Figure 8:
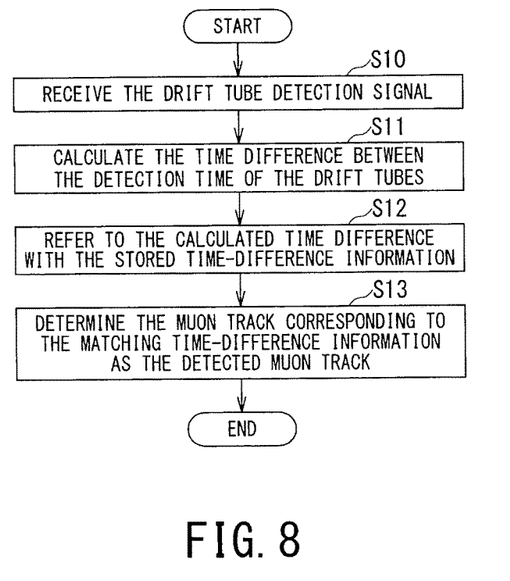
FIG. 8 is a flowchart showing an operation of the muon tracker according to this embodiment.

FIG. 8 is a flowchart showing an operation of the muon tracker 10 (FIG. 1 should be appropriately referred to).

The detection time-difference calculation circuit 14 receives the drift tube detection signal from the drift tube detector 12 (S10). The detection time-difference calculation circuit 14 calculates the time difference between the detection times of the drift tubes 11 on the basis of the detection times of the drift tubes 11 (S11).

The time-difference referring circuit 15 refers to the time difference calculated by the detection time-difference calculation circuit 14 with the time-difference information stored in the time-difference information database 16 (S12).

The muon track determining circuit 17 determines the muon track corresponding to the matching time-difference information as the muon track detected by the drift tube detector 12, and outputs the track to the display device, the imaging device or the like (S13).

The above-described muon tracker calculates the time differences between the detection times of the drift tubes, refers to the time differences with the time-difference information on the detection times preliminarily stored in association with the muon tracks, and derives the muon track. Thus, the muon track can be swiftly derived with a simple configuration without obtaining the transit time of the muon. Accordingly, for instance, the muon track can be derived in real time.

The embodiments of the present invention have thus been described. However, the embodiments have been presented as examples, which are not intended to limit the scope of the invention. The novel embodiments can be implemented in various other modes. Various omissions, replacements, and changes may be made within the scope without departing from the gist of the invention. The embodiments and modifications are encompassed by the scope and gist of the invention, and included in the invention described in claims and the equivalent scope thereof.

What is claimed is:

1. A muon tracker comprising:
    a drift tube detector comprising a plurality of drift tube arrays, each of the drift tube arrays comprises a plurality of drift tubes aligned parallel to each other, wherein each of the drift tubes is configured to detect a muon passing therein;
    a detection time-difference calculation circuit configured to calculate a time-difference between a plurality of muon detection times of at least two of the drift tubes that detect the muon passing therein, wherein the calculated time-difference includes a first time-difference between a first muon detection time of a first drift tube and a second muon detection time of a second drift tube;
    a time-difference information database that stores a relationship between a plurality of predetermined tracks of the muon passing the drift tube detector and a predetermined time-difference of possible detected time data to be detected for at least two of the drift tubes where each of the plurality of predetermined tracks passes;
    a time-difference comparing circuit configured to compare the calculated time-difference calculated at the detection time-difference calculation circuit with the predetermined time-difference stored in the time-difference information database; and
    a muon track determining circuit configured to determine a muon track as the predetermined track of the muon based on the comparison between the predetermined time-difference and the calculated time-difference.

2. The muon tracker according to claim 1, wherein a resolution of the plurality of predetermined tracks is lower than at least one of a spatial resolution and an angular resolution of the drift tube detector.

3. The muon tracker according to claim 1,
    wherein the plurality of drift tubes in the drift tube detector comprises a plurality of drift tube groups arranged in the drift tube detector, the drift tubes in each of the plurality of drift tube groups having the same arrangement,
    wherein the relationship stored in the time-difference information database comprises a representative relationship between the predetermined tracks and the predetermined time-difference in the drift tube group.

4. The muon tracker according to claim 1, wherein the time-difference comparing circuit is further configured to compare each one of the calculated time-differences with each corresponding one of the predetermined time-differences for each one of the drift tubes that detected the muon.

5. A muon tracking method, comprising:
    detecting a passing of a muon in a drift tube detector, wherein the drift tube detector comprises a plurality of drift tube arrays, each of the drift tube arrays comprises a plurality of drift tubes aligned parallel to each other;
    storing a relationship between a plurality of predetermined tracks of the muon passing the drift tube detector and a predetermined time-difference of possible detected time data to be detected for at least two of the drift tubes where each of the plurality of predetermined tracks passes;
    calculating a time-difference between a plurality of muon detection times of at least two of the drift tubes detected the passing of the muon, wherein the calculated time-difference includes a first time-difference between a first muon detection time of a first drift tube and a second muon detection time of a second drift tube;
    comparing the calculated time-difference with the predetermined time-difference; and
    determining a muon track as the predetermined track of the muon based on the comparison between corresponding the predetermined time-difference and the calculated time-difference.

* * * * *